June 20, 1944.  A. R. GOLD ET AL  2,351,606
WEIGHT INDICATING MEANS
Filed Feb. 7, 1941
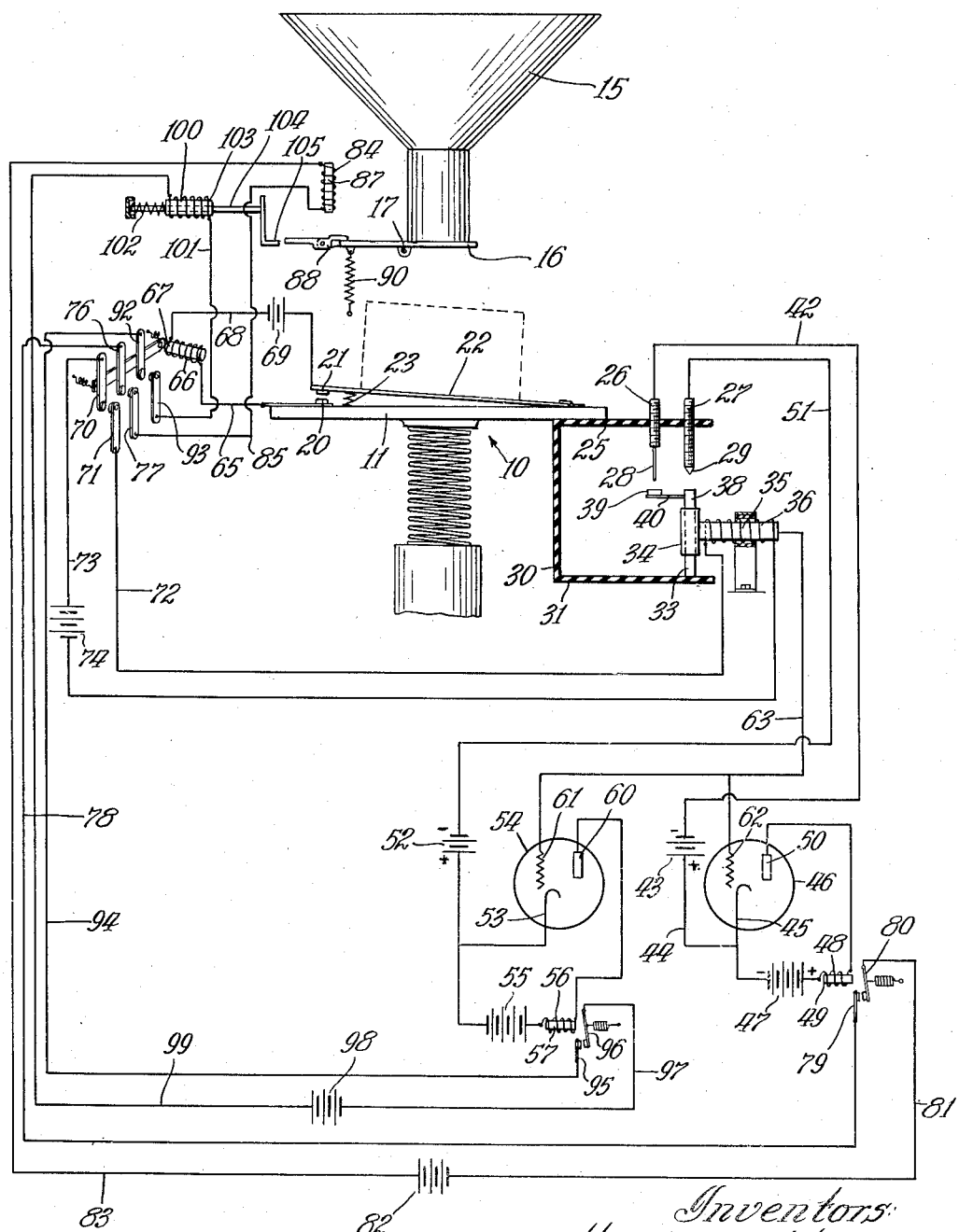
Inventors
Allan R. Gold and
Carl J. Heinisch
By Robert L. Kahn Atty.

Patented June 20, 1944

2,351,606

UNITED STATES PATENT OFFICE 2,351,606

WEIGHT INDICATING MEANS

Allan R. Gold and Carl J. Heinisch,
Chicago, Ill.

Application February 7, 1941, Serial No. 377,786

9 Claims. (Cl. 249—55)

This invention relates to weight indicating means and has particular application to means for indicating net weights of packaged or bottled goods. It is frequently necessary to dispose a predetermined quantity of material in a container at repeated intervals. Where the container weight is constant the compensation or allowance therefor is simple. In many instances, however, the weight variation in the container alone is sufficiently great so that the container itself must be weighed first.

It is evident that if this procedure must be repeated frequently that a considerable loss of time may occur in addition to the possibility of error. By virtue of the hereinafter disclosed invention, means are provided whereby a container is automatically weighed and an artificial reference point is provided from which additional weights of contained material may be added.

In general the invention provides a member movable with a weight responsive part of a scale during the initial weighing of the container. Thereafter such member is rendered relatively stationary and serves as an artificial reference point with respect to any predetermined element movable at all times in response to weighing movements of the scale. As specifically disclosed, the member and element cooperate to control an electrical circuit so that upon the existence of predetermined weight additional to that of the container the supply of material having the additional weight may be cut off.

Referring to the drawing, the single figure illustrates the invention.

For the sake of simplicity, the invention is shown in connection with a spring scale. However, any other type may be used. As shown, a spring scale 10 is provided with a platform 11 upon which a container, shown in dotted outline may rest and which container may be filled by any suitable means such as a hopper 15 having a cover plate 16 hinged at 17.

Platform 11 carries a suitable switch which is adapted to be closed by the weight of a container. This switch comprises a stationary contact 20 with which movable contact 21 cooperates. Movable contact 21 is carried by a leaf 22 which may be biased upwardly by spring 23 so that the contacts are normally open.

Platform 11 also carries an insulating plate 25 into which are mounted a pair of electrodes 26 and 27. Electrode 26 preferably carries a fine flexible spring wire antenna or extension 28 while electrode 27 terminates in a tip 29. Platform 11 also carries a bracket 30 having a shelf 31 extending below electrodes 26 and 27. Normally resting on shelf 31 is a magnetizable rod 33 disposed within a stationary non-magnetic guiding sleeve 34. For electrical contact purposes, sleeve 34 is preferably of metal such as brass or copper. This sleeve is carried by core 35 of an electromagnet having a magnetizing winding 36. Rod 33 has its top face 38 in vertical alignment with contact tip 29 while an auxiliary contact 39 is carried by an arm 40 from rod 33. Auxiliary contact 39 is in line with feeler contact 28 and so arranged as to close ahead of contacts 29 and 38.

Electrode 26 is connected by wire 42 to a bias battery 43 and thence by wire 44 to cathode 45 of a vacuum tube amplifier 46. Cathode 45 is also connected to a B battery 47 and thence through winding 48 of a relay 49 to anode 50. Electrode 27 is connected by wire 51 to a bias battery 52 and thence to cathode 53 of a vacuum tube amplifier 54. Cathode 53 is also connected to a B battery 55 and thence through winding 56 of a relay 57 to anode 60. Grids 61 and 62 are connected by wire 63 to magnet core 36.

Referring now to the platform switch, contact 20 is connected by wire 65 to winding 66 of a delay relay 67, and then by wire 68 to battery 69 and back to contact 21. Relay 67 is of the delay type and has three sets of contacts normally open but closed on relay energization. One set of such contacts, 70 and 71, are connected by wires 72 and 73 through a battery 74 to the terminals of magnetizing winding 36. Another set of contacts are 76 and 77. Contact 76 is connected by wire 78 to contact 79 of relay 49. Armature 80 of this relay is connected by wire 81 through a battery 82, conductor 83 to magnet winding 84 and thence by wire 85 back to contact 77. Magnet winding 84 has a core 87 and an armature 88 for controlling the position of cover plate 16. As shown, armature 88 is normally biased downwardly by spring 90 to maintain cover 16 closed.

The third set of relay contacts 92 and 93 are connected as follows. Contact 92 is connected by wire 94 to contact 95 of relay 57. The armature contact 96 of this relay is connected by wire 97 to battery 98 to conductor 99 and then through solenoid winding 100 and wire 101 to contact 93. Solenoid winding 100 has an armature 103 carrying a rod 104 supporting a detent 105, normally biased to the left but movable to an intercepting position in the path of armature 88.

It is understood that the various leads from the scale platform carried parts are flexible and fine enough so that no interference with normal weighing action occurs. Various expedients such as wire dipping into mercury may be used for extreme delicacy.

The operation of the system is as follows. Assume an empty container has been placed on platform 10. This results in switch contacts 20 and 21 being closed. Delay relay 67 is thus energized. Before it has time to operate, scale platform 10 has been depressed a distance corresponding to the weight of the container. This results in shelf 31 dropping a short distance and permits rod 33 to drop also. The delay in relay 67 is long enough to permit the scale to respond to the container weight as described above.

Upon operation of relay 67, the three sets of contacts are closed. The closure of contacts 70 and 71 results in the energization of magnetizing winding 35. This causes rod 33 to be pulled tightly against sleeve 34 and be retained in position in spite of any further downward movement of the scale platform.

Vacuum tubes 46 and 54 normally have space currents through them so that relays 49 and 57 are normally energized to close their respective contacts. Hence both windings 84 and 100 will be energized. The energization of winding 84 results in opening of cover 16 and flow of material into the container. The energization of winding 100 merely places stop 105 in the path of armature 88. It will be noted that armature 88 is jointed so that it may pass stop 105 in the opening direction of cover 16 but not in the closing direction.

Platform 10 of the scale will drop in response to the container filling. However, it should be noted that rod 33 will not drop with shelf 31. Thus as platform 10 drops, contacts 28 and 29 approach toward what are now fixed contacts 39 and 38. Contacts 28 and 39 close first. A circuit through rod 33, sleeve 34, core 36 is established with the result that the negative bias of battery 43 is impressed on grid 62 of tube 46. This cuts off the space current through this tube and causes relay 49 to open in response to its spring bias. Thus magnet 87 is de-energized, permitting spring 90 to pull cover 16 toward the closed position. However, stop 105 prevents complete cover closure so that some dribbling from hopper 15 into the container is possible. Finally when contacts 29 and 38 close, the cut off in space current in tube 54 occurs. Hence relay 57 opens and deenergizes winding 100. Spring 102 pulls stop 105 away and permits cover 16 to close completely. The spacing between contacts 29 and 38 is a function of the movement of platform 10 in response to the hopper material only and thus will determine the weight of such material. The amount of advance between contacts 28 and 39 on the one hand and contacts 29 and 38 on the other is obviously determined by the rate of feed, rapidity of operation of the system, and limits of accuracy of the filling. The auxiliary gap 28 and 39 and associated circuits for dribbler position control may be omitted entirely if desired.

It is clear that the movement of electrodes 26 and 27 and rod 33 should bear a definite relationship to the various scale responses. Within such limits, the invention may be applied to any part of any kind of a scale.

In the system as disclosed, the weight of rod 33 should be small compared to permissible weight variations of the container contents. It is clear that during initial weighing of the container that the weight of rod 33 is borne by the scale. Upon fixation of rod 33, further scale response will not occur until the equivalent weight of rod 33 has been applied. In practice, rod 33 may be quite light and be a thin wire.

What is claimed is:

1. A system for predetermining net weights on a weighing scale, said scale having a part movable in predetermined relation to the total weight actuating said scale with the total weight consisting of an initial weight and a predetermined additonal weight to be added successively thereon, said system comprising a vertically disposed rod resting on said part and movable therewith through said initial weighing operation, electromagnetic means for restraining said rod against additional movement and maintaining the same in a fixed position, means for energizing said electromagnetic means after said initial weighing operation, means for adding material making up such additional weight on said scale, means movable with said scale part relatively to said rod and cooperating therewith in response to scale movement due to said added material, and means controlled by said last-named means for cutting off addition of said material after said additional weight has attained a predetermined value.

2. A system for predetermining net weights on a weighing scale, said scale having a part movable in predetermined relation to the total weight actuating said scale with the total weight consisting of an initial weight and a predetermined additional weight to be added successively thereon, said system comprising a magnetizable rod movable to follow said part during a predetermined scale response, electromagnetic means for restraining said rod against motion and maintaining the same in a position fixed with reference to all weight responsive movable scale parts, means for energizing said electromagnetic means after said initial scale response to said initial weight, a movable contact carried by said part and cooperating with said magnetizable rod and normally movable through a distance corresponding to the scale response for said predetermined additional weight prior to contact closure, means for controlling the addition of material making up such additional weight on said scale and operative after said rod restraining means, and circuit means controlled by the closure of said contact and said magnetizable rod for cutting off the addition of said material.

3. The system of claim 2 wherein said part carries a second movable contact adapted to close a circuit through said magnetizable rod prior to the closure of the circuit by said first named movable contact, said second contact circuit having means for reducing the rate of addition of said material below normal.

4. A system for predetermining net weights on a weighing scale, said scale having a part movable in predetermined relation to the total weight actuating said scale with the total weight consisting of an initial weight and a predetermined additional quantity of material to be added thereon, said system comprising a vertical rod normally resting on said part and movable therewith during initial scale response, means for locking said rod in a predetermined vertical position, means operative after said scale response to said initial weight for energizing said locking means, two movable contacts carried by said part and cooperating with contacts carried by said rod, each pair of cooperating contacts being adapted to close successively after predetermined responses of said scale, means operating after said rod locking means for adding material on said scale, means controlled by the first closure of one pair of contacts for reducing the rate of flow of material to said scale below the normal rate and means controlled by the successive closure of the other pair of contacts for cutting off said flow of material.

5. The structure of claim 4 wherein said rod is a magnetizable rod and wherein the rod locking means include an electromagnet past which said rod is adapted to slide.

6. A weighing system comprising a scale having a weight receiving platform, said platform being adapted to receive a container initially and then have such container filled with material having a predetermined net weight, a reference member normally movable with a scale part having weight responsive movements, means normally inoperative for restraining said reference member from movement and leave said scale part free, means controlled by said container on said platform and operating after scale response to said container weight for energizing said restraining means, means acting upon the operation of said restraining means for supplying material to said container, a member movable with said scale part at all times during scale weighing operation, said member cooperating with said reference member, and means controlled by the cooperation of said member and reference member for cutting off the flow of material to said container after a predetermined net weight of such material in said container.

7. A system for determining net weight on a weighing scale, such scale having a platform assembly movable in predetermined relation to the total weight actuating such scale with the total weight consisting of an initial weight and a predetermined additional weight to be added thereon, said system comprising a bracket secured to said platform assembly to move therewith, a member movable with said bracket during an initial weighing operation, means for maintaining said member fixedly with reference to said platform assembly in the position assumed by it after the initial weighing operation to define a scole reference point, and means movable at all times with said platform assembly and cooperating with said member to delimit the additional weight to a predetermined value.

8. For use on a scale for predetermined net weights, a magnetizable rod normally following a scale part during an initial scale response, an electromagnet having at least one pole past which said rod normally travels during the initial scale response, means actuated by the weight of an initial mass placed upon the scale for energizing said electromagnet to hold said rod against further movement after completion of said initial scale response, means for contact therewith movable in weight responsive movements relative to said rod during additional weight responsive movements of said scale parts and a control circuit including said means and said rod.

9. A system for determining net weight on a weighing scale, said scale having a platform assembly movable in predetermined relation to the total weight actuating said scale, with the total weight consisting of an initial weight and a predetermined additional weight to be added thereon, said system comprising a fixed mounting member for movably supporting a contact member movable with said platform during an initial weight operation, means actuated by the initial weight placed upon the platform for maintaining said movable contact member fixedly with reference to said platform assembly and said fixed mounting member in the position assumed by it after the initial weighing operation to define a scale reference point, and means movable at all times with the platform assembly and cooperating with said fixed contact member to delimit the additional weight to a predetermined value.

ALLAN R. GOLD.
CARL J. HEINISCH.